United States Patent
Lee et al.

(10) Patent No.: US 10,826,041 B2
(45) Date of Patent: Nov. 3, 2020

(54) SEPARATOR, LITHIUM BATTERY INCLUDING THE SAME, AND METHOD OF MANUFACTURING SEPARATOR

(71) Applicant: Samsung SDI Co., Ltd., Yongin-si, Gyeonggi-do (KR)

(72) Inventors: Jungyoon Lee, Yongin-si (KR); Gain Kim, Yongin-si (KR); Yongkyoung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 75 days.

(21) Appl. No.: 16/260,818

(22) Filed: Jan. 29, 2019

(65) Prior Publication Data
US 2019/0237734 A1     Aug. 1, 2019

(30) Foreign Application Priority Data
Feb. 1, 2018    (KR) ........................ 10-2018-0013079

(51) Int. Cl.
*H01M 2/16*     (2006.01)
*H01M 2/14*     (2006.01)
(Continued)

(52) U.S. Cl.
CPC ......... *H01M 2/1686* (2013.01); *C08J 7/0427* (2020.01); *C09D 125/16* (2013.01); *H01M 2/145* (2013.01); *H01M 2/1653* (2013.01); *H01M 4/02* (2013.01); *H01M 10/0525* (2013.01); *H01M 10/0565* (2013.01); *H01M 10/0587* (2013.01); *H01M 2004/027* (2013.01);
(Continued)

(58) Field of Classification Search
CPC ......... H01M 10/0525; H01M 10/0565; H01M 10/0587; H01M 2004/027; H01M 2004/028; H01M 2300/0085; H01M 2300/0097; H01M 2/145; H01M 2/1653; H01M 2/1686; H01M 4/02
See application file for complete search history.

(56) References Cited

U.S. PATENT DOCUMENTS 9,178,198 B2    11/2015   Yeou et al.
9,570,751 B2    2/2017    Cha et al.
(Continued)

FOREIGN PATENT DOCUMENTS

EP    3 024 063 A1    5/2016
JP    2008-4442 A    1/2008
(Continued)

OTHER PUBLICATIONS

Japanese Office Action dated Jan. 6, 2020, for corresponding Japanese Patent Application No. 2019-014040 (5 pages).
(Continued)

*Primary Examiner* — Carlos Barcena
(74) *Attorney, Agent, or Firm* — Lewis Roca Rothgerber Christie LLP

(57) ABSTRACT

A separator includes a substrate and a coating layer on at least a surface of the substrate, the coating layer including first organic particles, second organic particles, and a first binder, the first organic particles have a smaller mean particle diameter (D50) than that of the second organic particles, and at least one selected from the first organic particles and the second organic particles has a core-shell structure.

16 Claims, 3 Drawing Sheets

(51) Int. Cl.
  *H01M 4/02* (2006.01)
  *H01M 10/0525* (2010.01)
  *H01M 10/0587* (2010.01)
  *C09D 125/16* (2006.01)
  *H01M 10/0565* (2010.01)
  *C08J 7/04* (2020.01)

(52) U.S. Cl.
  CPC ............ *H01M 2004/028* (2013.01); *H01M 2300/0085* (2013.01); *H01M 2300/0097* (2013.01)

(56) References Cited

U.S. PATENT DOCUMENTS

| | | | |
|---|---|---|---|
| 9,711,773 B2 | 7/2017 | Lai et al. | |
| 10,529,972 B2 | 1/2020 | Seok et al. | |
| 2002/0160269 A1 | 10/2002 | Choi et al. | |
| 2016/0141576 A1* | 5/2016 | Lee | H01M 10/4235 429/144 |
| 2016/0141579 A1 | 5/2016 | Seok et al. | |
| 2016/0149184 A1* | 5/2016 | Nam | H01M 2/1686 429/144 |
| 2016/0322620 A1* | 11/2016 | Kim | H01M 2/166 |
| 2017/0162848 A1 | 6/2017 | Pan et al. | |
| 2018/0053963 A1 | 2/2018 | Tanaka | |
| 2018/0294455 A1 | 10/2018 | Sakimoto et al. | |
| 2019/0319236 A1 | 10/2019 | Tanaka | |

FOREIGN PATENT DOCUMENTS

| | | |
|---|---|---|
| JP | 2013-251259 A | 12/2013 |
| JP | 2015-220223 A | 12/2015 |
| JP | 2016-100333 A | 5/2016 |
| JP | 2017-98203 A | 6/2017 |
| JP | 6155967 B2 | 6/2017 |
| KR | 10-2014-0106301 A | 9/2014 |
| KR | 10-2015-0051743 A | 5/2015 |
| KR | 10-2016-0038599 A | 4/2016 |
| KR | 10-2017-0026547 A | 3/2017 |
| KR | 10-2018-0003177 A | 1/2018 |
| WO | 2016/152026 A1 | 9/2016 |
| WO | WO 2017/073781 A1 | 5/2017 |
| WO | 2018/096975 A1 | 5/2018 |

OTHER PUBLICATIONS

Extended European Search Report for corresponding European Patent Application No. 19154378.4, dated Jul. 8, 2019, 9 pages.
Korean Office Action dated May 8, 2020, for corresponding Korean Patent Application No. 10-2018-0013079 (6 pages).

* cited by examiner

SEPARATOR, LITHIUM BATTERY INCLUDING THE SAME, AND METHOD OF MANUFACTURING SEPARATOR

CROSS-REFERENCE TO RELATED APPLICATION

This application claims priority to and the benefit of Korean Patent Application No. 10-2018-0013079, filed on Feb. 1, 2018, in the Korean Intellectual Property Office, the entire content of which is incorporated herein in its entirety by reference.

BACKGROUND

1. Field

One or more embodiments relate to separators, lithium batteries including the separators, and methods of manufacturing the separators.

2. Description of the Related Art

To meet requirements or desirable characteristics for miniaturization and high performance of various devices, miniaturization and weight reduction of lithium batteries are becoming more important. In addition, for application to the field of electric vehicles and the like, discharge capacity, energy density, and cycle characteristics of lithium batteries are becoming more important. To satisfy these applications, lithium batteries are being designed to have high discharge capacity per unit volume, high energy density, and excellent lifespan characteristics.

In lithium batteries, a separator is arranged between a positive electrode and a negative electrode to prevent a short circuit therebetween. An electrode assembly, which includes a positive electrode, a negative electrode, and a separator between the positive and negative electrodes, is wound into a jelly-roll form, and the jelly-roll-type electrode assembly is roll-pressed to enhance adhesion between the positive electrode/negative electrode and the separator.

Olefin-based polymers are widely used in the fabrication of separators for lithium batteries. Olefin-based polymers have excellent flexibility, but have low strength when impregnated with an electrolytic solution and undergo rapid thermal contraction at high temperatures of 100° C. or more, resulting in the occurrence of a short circuit of the battery. To address these problems, a separator having enhanced strength and enhanced thermal resistance by coating ceramic on a surface of a porous olefin-based polymer substrate has been proposed. However, such a ceramic-coated separator has low adhesion with a negative electrode/positive electrode, and thus, a battery including such a separator is easily deformed due to a rapid change in volume of the battery during charging and discharging.

Thus, to enhance adhesion between the ceramic-coated separator and a positive electrode/negative electrode, a separator including a binder added to a ceramic material has been proposed. However, the separator including the binder added to the ceramic material also has problems, such as an increase in internal resistance due to reduced porosity or easy deterioration of the lithium battery due to swelling of the binder in an electrolytic solution.

Therefore, there is a need to develop a separator that overcomes existing limitations and has excellent thermal stability, in order to meet the increasing demand for thermal stability of separators due to the increase in capacity of batteries.

SUMMARY

One or more embodiments include separators having enhanced thermal stability.

One or more embodiments include lithium batteries including the separator.

One or more embodiments include methods of manufacturing the separator.

Additional aspects of embodiments will be set forth in part in the description which follows and, in part, will be apparent from the description, or may be learned by practice of the presented embodiments.

According to one or more embodiments, a separator includes a substrate and a coating layer on at least a surface of the substrate, wherein the coating layer includes first organic particles, second organic particles, and a first binder, wherein the first organic particles have a smaller mean particle diameter (D50) than that of the second organic particles, and at least one selected from the first organic particles and the second organic particles has a core-shell structure.

According to one or more embodiments, a lithium battery includes a positive electrode; a negative electrode; and the above-described separator between the positive electrode and the negative electrode.

According to one or more embodiments, a method of manufacturing a separator includes preparing a slurry including first organic particles, second organic particles, and a first binder; applying the slurry to at least a surface of a substrate; and drying and roll-pressing the resulting substrate.

BRIEF DESCRIPTION OF THE DRAWINGS

These and/or other aspects of embodiments will become apparent and more readily appreciated from the following description of the embodiments, taken in conjunction with the accompanying drawings in which.

DETAILED DESCRIPTION

Figure 1:
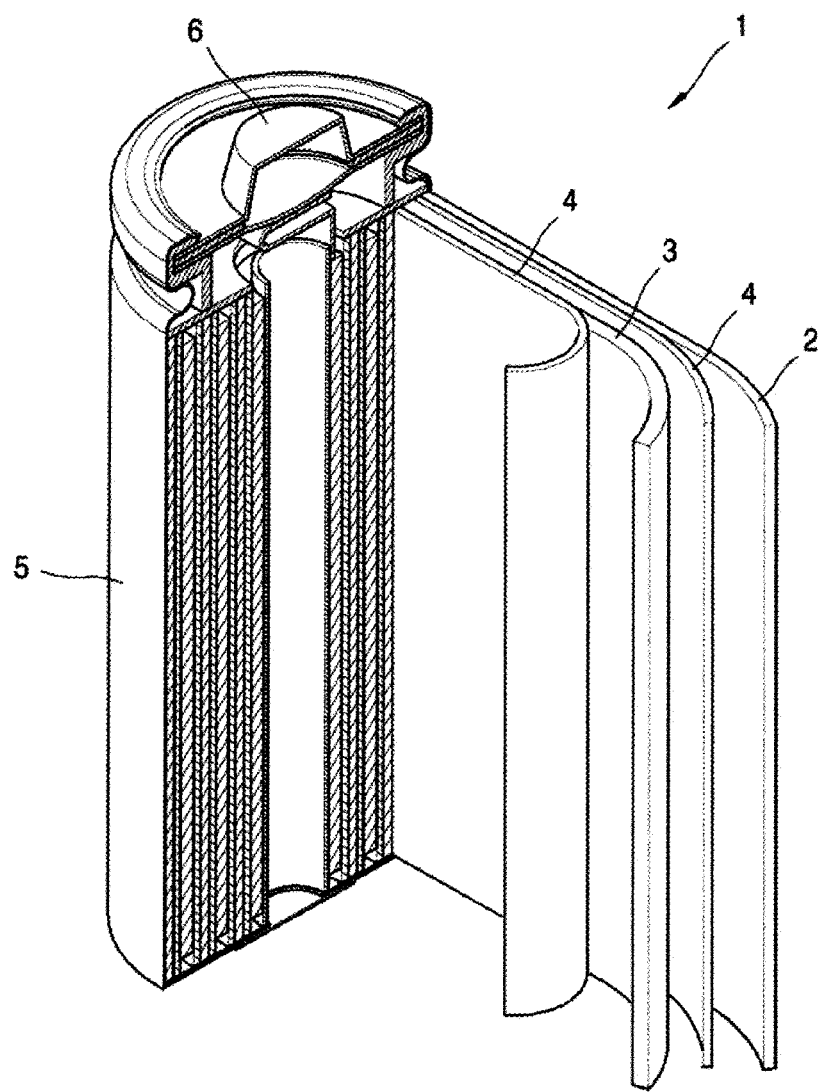
FIG. 1 is a view of a lithium battery according to an example embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the subject matter of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a separator according to example embodiments and a lithium battery including the separator will be described in more detail.

A separator according to an embodiment includes a substrate and a coating layer on at least a surface of the substrate, wherein the coating layer includes first organic particles, second organic particles, and a first binder, the first organic particles having a smaller mean particle diameter (D50) than that of the second organic particles, and at least one selected from the first organic particles and the second organic particles has a core-shell structure. As used herein, the term "D50" refers to a particle diameter at which 50 mass % of particles in a sample have a smaller particle diameter.

In the related art, inorganic particles, e.g., ceramics, are included instead of the first organic particles and the second organic particles, but in this case, it is difficult to provide suitable or satisfactory thermal resistance due to problems such as insufficient packing in a coating layer, and the like, and thus, when the capacity of a battery is increased, thermal stability at a high temperature is reduced.

Therefore, according to embodiments of the present disclosure, instead of inorganic particles, first and second organic particles having different mean particle diameters, e.g., a bimodal distribution of organic particle sizes, are included in a coating layer of the separator, and thus, the first organic particles having a smaller mean particle diameter may fill pores between the second organic particles, and accordingly, a shut-down function at a high temperature may be more effectively implemented. Thus, a lithium battery according to embodiments of the present disclosure may exhibit enhanced thermal stability and enhanced lifespan characteristics.

For example, a ratio of the mean particle diameter (D50) of the first organic particles to the mean particle diameter (D50) of the second organic particles may be in a range of about 0.9:1 to about 0.1:1, but the present disclosure is not limited thereto.

The mean particle diameter (D50) of the first organic particles is not particularly limited as long as it is smaller than the mean particle diameter (D50) of the second organic particles. For example the mean particle diameter (D50) of the first organic particles, may be in a range of about 0.1 μm to about 0.3 μm.

When the mean particle diameter (D50) of the first organic particles is outside the above range, e.g., greater than 0.3 μm, it is difficult for the first organic particles to be effectively packed into pores between the second organic particles, and thus, it is difficult to provide suitable or satisfactory thermal stability. When the mean particle diameter (D50) of the first organic particles is less than 0.1 μm, adhesion between the first organic particles and the substrate of the separator is deteriorated, and thus, battery stability is reduced.

The mean particle diameter (D50) of the second organic particles is not particularly limited as long as it is greater than the mean particle diameter (D50) of the first organic particles. For example, the mean particle diameter (D50) of the second organic particles may be in a range of about 0.3 μm to about 0.6 μm.

When the mean particle diameter (D50) of the second organic particles is outside the above range, e.g., less than 0.3 μm, the size of pore between the second organic particles decreases, and thus, it is difficult for the first organic particles to be effectively packed between the second organic particles, and thus, it is difficult to provide suitable or satisfactory thermal stability. When the mean particle diameter (D50) of the second organic particles is greater than 0.6 μm, the volume of the second organic particles in the separator is excessively increased, and thus, overall battery capacity deteriorates.

The first organic particles may be obtained from at least one compound selected from a styrene-based compound and a derivative thereof, an acrylate-based compound and a derivative thereof, a diallyl phthalate-based compound and a derivative thereof, a polyimide-based compound and a derivative thereof, a copolymer thereof, and a mixture thereof. For example, the first organic particles may include crosslinked polystyrene (PS) particles and/or crosslinked polymethylmethacrylate (PMMA) particles. In some embodiments, the first organic particles include crosslinked PMMA particles. When the above-described cross-linked polymer is used, thermal resistance may be enhanced and contraction of a porous substrate at a high temperature may be effectively suppressed or reduced. In some embodiments, the first organic particles may include at least one selected from a compound including a styrene group (and derivatives thereof), a compound including an acrylate group (and derivatives thereof), a compound including a diallyl phthalate group (and derivatives thereof), a compound including a polyimide group (and derivatives thereof), a copolymer thereof, and a mixture thereof.

The first organic particles may have a thermal decomposition temperature of 150° C. or more. For example, the thermal decomposition temperature of the first organic particles may be in a range of about 150° C. to about 300° C.

In this regard, the thermal decomposition temperature refers to a carbonization temperature, e.g., a temperature at which organic particles are carbonized.

The first organic particles having a thermal decomposition temperature of 150° C. or more replace inorganic particles, and thus, thermal stability of the separator may be maintained.

In one embodiment, both the first organic particles and the second organic particles may have a core-shell structure.

In another embodiment, only one selected from the first organic particles and the second organic particles may have a core-shell structure.

For example, in some embodiments, the first organic particles (or only the first organic particles) may have a core-shell structure.

For example, in some embodiments, the second organic particles (or only the second organic particles) may have a core-shell structure.

The core-shell structure includes a core portion and a shell portion, and a weight of the shell portion may be 50 wt % or more with respect to a total weight of the core portion.

In this regard, the core portion may have a thermal decomposition temperature of 150° C. or more and include at least one selected from an acrylate-based compound and a derivative thereof, a diallyl phthalate-based compound and a derivative thereof, a polyimide-based compound and a derivative thereof, a copolymer thereof, and a mixture thereof. For example, the core portion may include at least one selected from a compound including an acrylate group (and derivatives thereof), a compound including a diallyl phthalate group (and derivatives thereof), a compound including a polyimide group (and derivatives thereof), a copolymer thereof, and a mixture thereof.

The shell portion may have a melting point ($T_m$) of 130° C. or less and include at least one selected from polypropylene (PP), polyethylene (PE), polystyrene (PS), polyvinylidene fluoride (PVDF), polymethylmethacrylate (PMMA), an acrylate-based compound (e.g., a compound including an acrylate group), polyacrylonitrile (PAN), and an azodicarbonamide-based compound (a compound including an azodicarbonamide group).

When the second organic particles have a core-shell structure, the shell portions of the second organic particles having a melting point of 130° C. or less are melted at a high temperature of 130° C. or more, and the separator is coated with the melted shell portions, thus imparting a shut-down effect to the separator.

For example, a mass ratio of the first organic particles to the second organic particles may be in a range of about 10:90 to about 99:1, but the present disclosure is not limited thereto. When the mass ratio of the first organic particles to the second organic particles is within the above range, the coating density of the separator may be increased and improved thermal stability may be achieved.

Meanwhile, the first binder may enhance the thermal resistance of the separator.

The first binder is not particularly limited as long as it is capable of enhancing thermal resistance. The first binder may contain, for example, an acrylate group.

The first binder may have a glass transition temperature ($T_g$) of about 50° C. to about 100° C.

Figure 2:
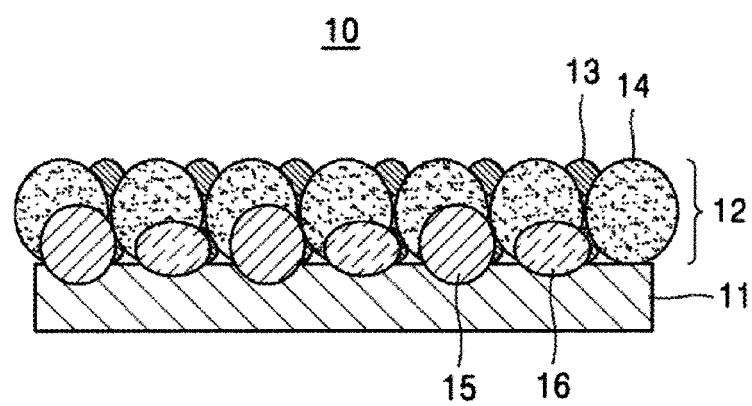
FIG. 2 is a view of a separator according to an example embodiment.
Figure 3:
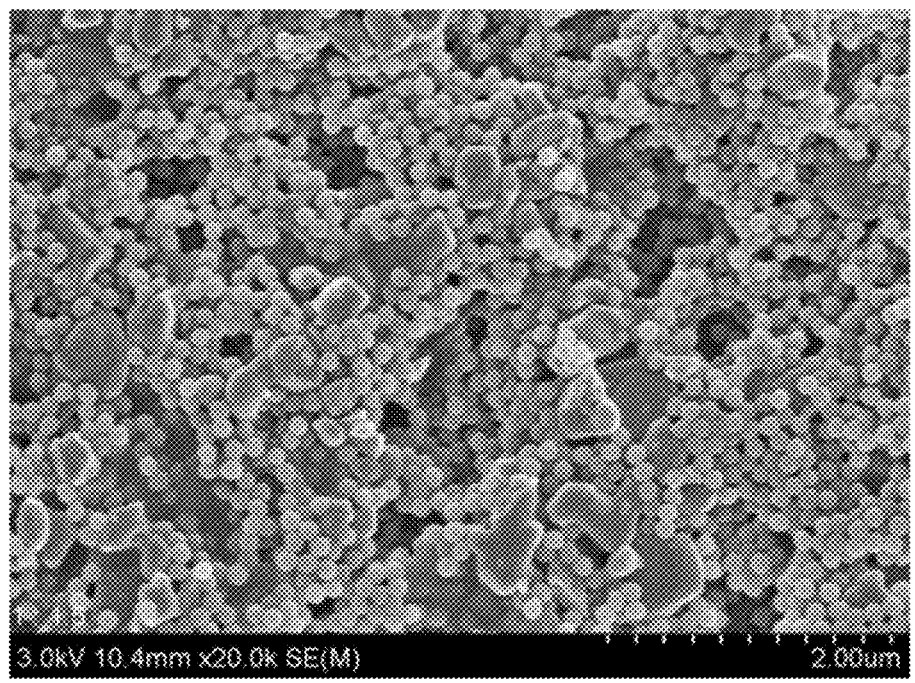
FIG. 3 is a scanning electron microscope (SEM) image showing a surface of a separator according to an example embodiment.

FIG. 2 is a view of a separator 10 according to an example embodiment. An example embodiment of the present disclosure will be described with reference to FIG. 2. The separator 10 includes a substrate 11 and a coating layer 12 on at least a surface of the substrate 11, the coating layer 12 includes first organic particles 13, second organic particles 14, and a first binder 15. The first organic particles 13 have a smaller mean particle diameter (D50) than that of the second organic particles 14, and at least one selected from the first organic particles 13 and the second organic particles 14 has a core-shell structure.

In this regard, the coating layer 12 may further include a second binder 16, and the second binder 16 may have a mean particle diameter (D50) smaller than or the same as the mean particle diameter (D50) of the second organic particles 14. A second binder may exhibit adhesion with a substrate and thermal resistance.

Because the mean particle diameter (D50) of the second binder is smaller than or the same as the mean particle diameter (D50) of the second organic particles included in the coating layer of the separator, it is possible to obtain a suitable or appropriate electrode deintercalation area. Thus, adhesion between an electrode and the separator may be enhanced, and consequently, an increase in the thickness of an electrode assembly including an electrode and the separator may be suppressed or reduced. Accordingly, energy density per unit volume of a lithium battery including the electrode assembly may be enhanced. In addition, due to enhanced adhesion, a volumetric change of a lithium battery during charging and discharging may be suppressed or reduced, and thus, deterioration of the lithium battery due to the volumetric change may be suppressed or reduced. Moreover, the amount of the binder may be suitably or appropriately adjusted, and consequently, battery deterioration that results from the inclusion of an excess amount of binder may be suppressed or reduced. Accordingly, lifespan characteristics of a lithium battery may be further enhanced.

For example, a ratio of the mean particle diameter (D50) of the second organic particles to the mean particle diameter (D50) of the second binder may be in a range of about 1:1 to about 2.5:1. For example, the ratio of the mean particle diameter (D50) of the second organic particles to the mean particle diameter (D50) of the second binder may be in a range of about 1.5:1 to about 2.5:1.

When the ratio of the mean particle diameter (D50) of the second organic particles to the mean particle diameter (D50) of the second binder is outside the above range, e.g., less than 1, adhesion between an electrode and the separator deteriorates, and thus, the thickness of an electrode assembly is increased. On the other hand, when the ratio of the mean particle diameter (D50) of the second organic particles to the mean particle diameter (D50) of the second binder is greater than 2.5, battery lifespan may be deteriorated due to an excess amount of binder.

In some embodiments, the second binder may be located in at least one pore selected from pores between the second organic particles, pores between particles of the first binder, and pores between the second organic particles and the first binder. As described above, because the second binder is included in the pores of the coating layer, the thickness of the coating layer formed in the separator may be minimized or reduced and a certain level of air permeability may be secured.

The mean particle average (D50) of the second binder may be smaller than or the same as the mean particle diameter (D50) of the first binder.

The mean particle average (D50) of the second binder may be greater than or the same as the mean particle diameter (D50) of the first organic particles.

The second binder may have a glass transition temperature ($T_g$) of −40° C. or less. For example, the glass transition temperature ($T_g$) of the second binder may be in a range of about −80° C. to −40° C. In some embodiments, the glass transition temperature ($T_g$) of the second binder may be in a range of about −80° C. to −50° C. As described above, because the second binder has a low glass transition temperature ($T_g$), the second binder may be present in a surface contact form after drying the coating layer.

The second binder may include an acrylate group or a styrene group.

In one embodiment, the coating layer may not include inorganic particles. For example, the coating layer may be substantially free, or completely free of inorganic particles. As described herein, when the coating layer is substantially free of inorganic particles, the coating layer includes inorganic particles, if at all, as an incidental impurity and/or in an amount that does not substantially affect the thermal stability and/or lifespan of the coating layer and/or separator.

In one embodiment, the coating layer may have a thickness of about 0.1 µm to about 3.0 µm. For example, in the coating layer included in the separator of the present disclosure, a ratio of the mean particle diameter of the first organic particles, the mean particle diameter of the second organic particles, and the mean particle diameters of the first and second binders may be limited to within a set (e.g., predetermined) range, and thus, not only adhesion of the coating layer to an electrode, but also adhesion of the coating layer to the substrate may be increased. Accordingly, it may be possible to form the coating layer into a thin film. For example, the coating layer may have a thickness of about 0.1 µm to about 2 µm. In some embodiments, the thickness of the coating layer may be in a range of about 0.1 µm to about 1.5 µm. For example, the thickness of the coating layer may be in a range of about 0.1 µm to about 1 µm. When the thickness of the coating layer is within the above ranges, a separator including the coating layer may exhibit enhanced adhesion and enhanced air permeability. In addition, the thickness of an electrode assembly may be minimized or reduced, and thus, capacity per volume of a battery may be maximized or increased.

For example, the coating layer may be arranged on a surface or opposite surfaces of the substrate. In addition, the coating layer may be a layer including first organic particles, second organic particles, and a first binder, or a layer including first organic particles, second organic particles, a first binder, and a second binder. In addition, the coating layer may have a single-layered structure or a multi-layered structure.

For example, the coating layer may be arranged on only a surface of the substrate and may not be arranged on another surface of the substrate. The coating layer arranged on only a surface of the substrate may be a layer including first organic particles, second organic particles, and a first binder, or a layer including first organic particles, second organic particles, a first binder, and a second binder. In addition, the coating layer may have a multi-layered structure. In the multi-layered coating layer, a layer including first organic particles, second organic particles, and a first binder, and a layer including first organic particles, second organic particles, a first binder, and a second binder may be arbitrarily arranged. The multi-layered structure may be a bi-layered structure, a three-layered structure, or a four-layered structure, but the present disclosure is not limited thereto, and the multi-layered structure may be selected according to required characteristics of the separator.

In some embodiments, the coating layer may be arranged on opposite surfaces of the substrate. The coating layers arranged on respective opposite surfaces of the substrate may be each independently a layer including first organic particles, second organic particles, and a first binder, or a layer including first organic particles, second organic particles, a first binder, and a second binder. For example, both the coating layers arranged on the respective opposite surfaces of the substrate may be a layer including first organic particles, second organic particles, and a first binder. In addition, at least one selected from the coating layers arranged on the respective opposite surfaces of the substrate may have a multi-layered structure. In the multi-layered coating layer, a layer including first organic particles, second organic particles, and a first binder, and a layer including first organic particles, second organic particles, a first binder, and a second binder may be arbitrarily arranged. The multi-layered structure may be a bi-layered structure, a three-layered structure, or a four-layered structure, but the present disclosure is not limited thereto, and the multi-layered structure may be selected according to required characteristics of the separator. By arranging the coating layer on opposite surfaces of the substrate, adhesion between a binder and an electrode active material layer may be further enhanced, and thus, a volumetric change of a lithium battery may be suppressed or reduced.

In the separator of the present disclosure, the substrate may be a porous substrate. The porous substrate may be a porous membrane including a polyolefin. Polyolefins may have an excellent short-circuit prevention or reduction effect and may also enhance battery stability due to a shut-down effect. For example, the porous substrate may be a film formed of a resin selected from polyolefins such as polyethylene, polypropylene, polybutene, and polyvinyl chloride; and mixtures or copolymers thereof, but the present disclosure is not limited thereto, and any suitable porous membrane that may be used in the art may be used. For example, a porous membrane formed of a polyolefin-based resin; a porous membrane formed by weaving a polyolefin-based fiber; a non-woven fabric including a polyolefin; an aggregate of insulating material particles; and/or the like may be used. For example, the porous membrane including a polyolefin enables a binder solution for preparing the coating layer formed on the substrate to have excellent coatability and enables a reduction in the thickness of the separator, and thus, may increase the proportion of an active material in a battery, resulting in increased capacity per unit volume.

For example, the polyolefin used as a material of the porous substrate may be a homopolymer such as polyethylene, polypropylene, and/or the like; or a copolymer or mixture thereof. Examples of polyethylenes include low-density polyethylene, medium-density polyethylene, and high-density polyethylene. In terms of mechanical strength, high-density polyethylene may be used. In addition, to impart flexibility, a mixture of two or more polyethylenes may be used. A polymerization catalyst used in preparing polyethylenes is not particularly limited, and may include a Ziegler-Natta catalyst, a Phillips catalyst, a metallocene catalyst, and/or the like. To impart both mechanical strength and high permeability, the polyethylene used may have a weight average molecular weight of about 100,000 to about 12,000,000 daltons, for example, about 200,000 to 3,000,000 daltons. Examples of polypropylenes include homopolymers, random copolymers, and block copolymers, and one selected therefrom or a mixture of two or more thereof may be used. In addition, the polymerization catalyst is not particularly limited, and may be a Ziegler-Natta catalyst, a metallocene catalyst, and/or the like. In addition, the stereo-regularity of the polypropylenes is not particularly limited, and an isotactic, syndiotactic, or atactic polypropylene may be used. In some embodiments, an inexpensive isotactic polypropylene may be used. In addition, within a range that does not adversely affect the features of the coating layer of the present disclosure, a polyolefin other than polyethylene or polypropylene and an additive such as an antioxidant and/or the like may be added to the polyolefin.

For example, the porous substrate may include a polyolefin such as polyethylene, polypropylene, and/or the like and may have a multilayered structure including two or more layers, and may also be formed as mixed multilayers such as a two-layered separator formed of polyethylene/polypropylene, a three-layered separator formed of polyethylene/polypropylene/polyethylene, a three-layered separator formed of polypropylene/polyethylene/polypropylene, and/or the like, but the present disclosure is not limited thereto. Any suitable material and configuration for the porous substrate that may be used in the art may be used.

For example, the porous substrate may include a diene-based polymer prepared by polymerizing a monomer composition including a diene-based monomer (e.g., a monomer including a diene group). The diene-based monomer may be a conjugated diene-based monomer or a non-conjugated diene-based monomer. For example, the diene-based monomer may include at least one selected from the group consisting of 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinylnorbornene, dicyclopentadiene, and 1,4-hexadiene, but the present disclosure is not limited thereto, and any suitable diene-based monomer that may be used in the art may be used.

In the separator, the porous substrate may have a thickness of about 1 μm to about 100 μm. For example, the thickness of the porous substrate may be in a range of about 1 μm to about 30 μm. In some embodiments, the thickness of the porous substrate may be in a range of about 3 μm to about 20 μm. For example, the thickness of the porous substrate may be in a range of about 3 μm to about 15 μm. In some embodiments, the thickness of the porous substrate may be in a range of about 3 μm to about 12 μm. When the thickness of the porous substrate is less than 1 μm, it may be difficult to maintain mechanical and physical characteristics of the separator, and when the thickness of the porous substrate is greater than 100 μm, internal resistance of the lithium battery may be increased.

In the separator, the porous substrate may have a porosity of about 5% to about 95%. When the porosity of the porous substrate is less than 5%, the internal resistance of a lithium battery may be increased, and when the porosity of the porous substrate is greater than 95%, it may be difficult to maintain mechanical and physical characteristics of the porous substrate.

In the separator, the porous substrate may have a pore size of about 0.01 μm to about 50 μm. For example, the pore size of the porous substrate in the separator may be in a range of 0.01 μm to about 20 μm. For example, the pore size of the porous substrate in the separator may be in a range of 0.01 μm to about 10 μm. When the pore size of the porous substrate is less than 0.01 μm, the internal resistance of a lithium battery may be increased, and when the pore size of the porous substrate is greater than 50 μm, it may be difficult to maintain mechanical and physical characteristics of the porous substrate.

In some embodiments, the coating layer may include inorganic particles.

The inorganic particles may be a metal oxide, a metalloid oxide, or a combination thereof. For example, the inorganic particles may include at least one selected from alumina ($Al_2O_3$), boehmite, $BaSO_4$, MgO, $Mg(OH)_2$, clay, silica ($SiO_2$), $TiO_2$, $SnO_2$, $CeO_2$, NiO, CaO, ZnO, $ZrO_2$, $Y_2O_3$, $SrTiO_3$, $BaTiO_3$, and $MgF_2$. The alumina, silica, and the like have a small particle size, and thus, may be readily used to prepare a dispersion. The inorganic particles may have a spherical form, a plate form, a fibrous form, and/or the like, but the present disclosure is not limited thereto, and any suitable form that may be used in the art may be used.

Non-limiting examples of the inorganic particles having a plate form include alumina and boehmite. In this case, a reduction in an area of the separator at a high temperature may be further suppressed or reduced, and relatively greater porosity may be secured.

When the inorganic particles have a plate form or a fibrous form, the inorganic particles may have an aspect ratio of about 1:5 to about 1:100. For example, the aspect ratio of the inorganic particles may be in a range of about 1:10 to about 1:100. For example, the aspect ratio of the inorganic particles may be in a range of about 1:5 to about 1:50. For example, the aspect ratio of the inorganic particles may be in a range of about 1:10 to about 1:50.

A length ratio of a major axis to a minor axis in a plane of the plate-type (e.g., plate-shaped) inorganic particles may be in a range of about 1 to about 3. For example, the length ratio of a major axis to a minor axis in the plane may be in a range of about 1 to about 2. In some embodiments, the length ratio of a major axis to a minor axis in the plane may be about 1. The aspect ratio and the length ratio of a major axis to a minor axis may be measured using a scanning electron microscope (SEM). When the aspect ratio and the length ratio of a major axis to a minor axis are within the above-described ranges, contraction of the separator may be suppressed or reduced and relatively enhanced porosity may be secured.

When the inorganic particles have a plate form, an average angle of planes of the inorganic particles with respect to a surface of the porous substrate may be in a range of about 0° to about 30°. For example, the angles of planes of the inorganic particles with respect to a surface of the porous substrate may converge to 0°. In some embodiments, the surface of the porous substrate may be parallel (e.g., substantially parallel) to the planes of the inorganic particles. For example, when the average angle of planes of the inorganic particles with respect to a surface of the porous substrate is within the above range, thermal contraction of the porous substrate may be effectively prevented or reduced, thereby providing a separator with reduced contraction.

A method of manufacturing the above-described separator, according to another embodiment includes: (a) preparing a slurry including first organic particles, second organic particles, and a first binder; and (b) applying the slurry to at least a surface of a substrate and drying and roll-pressing the resulting substrate.

In process (b), the slurry may be applied to opposite surfaces of the substrate, and in this case, the slurry may be concurrently (e.g., simultaneously) applied to the opposite surfaces of the substrate.

The slurry may further include a second binder. The separator may be manufactured by applying the slurry to the substrate. The method of applying the slurry is not particularly limited and any suitable method that may be used in the art may be used. For example, the separator may be manufactured by a method including, for example, printing, compression, intrusion, roller coating, blade coating, brush coating, dip coating, spray coating, cast coating, and/or the like.

As described above, because the separator of the present disclosure includes organic particles having a bimodal particle size distribution, a process of dispersing an inorganic material does not need to be performed, and thus, it is possible to simplify the manufacturing processes. As such, the manufacturing processes may be simplified and abrasion of equipment caused by the dispersion of an inorganic material and/or the like may be reduced. Thus, manufacturing costs may be reduced.

A peel strength of the substrate and the coating layer of the separator may be in a range of about 5 gf/mm to about 12 gf/mm. Within this peel strength range, a volumetric change of a lithium battery may be effectively suppressed or reduced.

The separator may have an air permeability of about 100 sec/100 ml to about 900 sec/100 ml. Within this air permeability range, an increase in internal resistance of a lithium battery may be effectively suppressed or reduced.

The separator may have a breakdown voltage (BDV) of about 1.2 kV to about 2.0 kV.

A lithium battery according to another embodiment includes: a positive electrode; a negative electrode; and the above-described separator between the positive electrode and the negative electrode. Because the lithium battery includes the above-described separator, thermal stability and BDV characteristics (e.g., withstand voltage characteristics) are enhanced, and thus, an electrode short-circuit at a high temperature may be suppressed or reduced. Furthermore, even when an applied voltage is increased, the separator exhibits enhanced stability, and thus, the lithium battery may be used even in high-output devices. In addition, because the lithium battery includes the above-described separator, adhesion between an electrode (positive and negative electrodes) and the separator is increased, and thus, a volumetric change of the lithium battery during charging and discharging may be suppressed or reduced. Accordingly, deterioration of the lithium battery due to the volumetric change of the lithium battery may be suppressed or reduced, resulting in enhanced stability and lifespan characteristics of the lithium battery.

The lithium battery may have a 3-point bending strength of 150 N or more. For example, the 3-point bending strength of the lithium battery may be in a range of about 150 N to about 200 N.

The lithium battery may be manufactured using, for example, the following method.

First, a negative active material composition, in which a negative active material, a conductive material, a binder, and a solvent are mixed, is prepared. The negative active material composition is directly coated onto a metal current collector and the coated metal current collector is dried, thereby manufacturing a negative electrode plate. In another embodiment, the negative active material composition may be cast on a separate support, and then a film separated from the support may be laminated on a metal current collector, thereby manufacturing a negative electrode plate. A method of manufacturing the negative electrode is not limited to the above-described methods, and any other suitable manufacturing methods may be used.

The negative active material may be a non-carbonaceous material. For example, the negative active material may include at least one selected from the group consisting of a metal alloyable with lithium, and alloys and oxides of the metal alloyable with lithium.

For example, the metal alloyable with lithium may include silicon (Si), tin (Sn), aluminum (Al), germanium (Ge), lead (Pb), bismuth (Bi), antimony (Sb), an Si—Y alloy (where Y is an alkali metal, an alkali earth metal, a Group 13 element, a Group 14 element, a Group 15 element, a Group 16 element, a transition metal, a rare earth element, or a combination thereof, except for Si), an Sn—Y alloy (where Y is an alkali metal, an alkali earth metal, a Group 13 element, a Group 14 element, a Group 15 element, a Group 16 element, a transition metal, a rare earth element, or a combination thereof, except for Sn), and/or the like. Examples of the element Y include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and combinations thereof.

For example, the transition metal oxide may be lithium titanium oxide, vanadium oxide, lithium vanadium oxide, and/or the like.

For example, a non-transition metal oxide may be $SnO_2$, $SiO_x$ (where $0<x<2$), and/or the like.

In some embodiments, the negative active material may be at least one selected from the group consisting of Si, Sn, Pb, Ge, Al, $SiO_x$ where $0<x\leq2$, $SnO_y$ where $0<y\leq2$, $Li_4Ti_5O_{12}$, $TiO_2$, $LiTiO_3$, and $Li_2Ti_3O_7$, but the present disclosure is not limited thereto, and any suitable non-carbonaceous negative active material used in the art may be used.

In addition, a composite of the non-carbonaceous negative active material and a carbonaceous material may also be used, and the negative active material may further include, in addition to the non-carbonaceous material, a carbonaceous negative active material.

The carbonaceous material may be crystalline carbon, amorphous carbon, or a mixture thereof. Examples of the crystalline carbon include graphite such as natural graphite and artificial graphite that is in non-shaped, plate, flake, spherical, or fibrous form. Non-limiting examples of the amorphous carbon include soft carbon (carbon sintered at low temperatures), hard carbon, meso-phase pitch carbides, and sintered cokes.

The conductive material may include acetylene black, Ketjen black, natural graphite, artificial graphite, carbon black, carbon fiber, metal powder such as copper powder, nickel powder, aluminum powder, silver powder, and/or the like, metal fibers, and/or the like, and one selected from conductive materials such as polyphenylene derivatives and the like or a mixture of two or more of these materials may be used, but the present disclosure is not limited thereto, and any suitable conductive material that may be used in the art may be used. In addition, the above-described crystalline carbonaceous materials may be added as a conductive material.

The binder may include a vinylidenefluoride/hexafluoropropylene copolymer, polyvinylidene fluoride (PVDF), polyacrylonitrile, polymethylmethacrylate, polytetrafluoroethylene, a mixture of these polymers, a styrene butadiene rubber-based polymer, and/or the like, but the present disclosure is not limited thereto, and any suitable binder that may be used in the art may be used.

The solvent may include N-methylpyrrolidone, acetone, water, and/or the like, but the present disclosure is not limited thereto, and any suitable solvent that may be used in the art may be used.

The amounts of the negative active material, the conductive material, the binder, and the solvent may be the same amounts as those generally used in the art for a lithium battery. At least one of the conductive material, the binder, and the solvent may be omitted according to the use and configuration of the lithium battery.

Meanwhile, the binder used in manufacturing the negative electrode may be the same as the binder included in the coating layer of the separator.

Next, a positive active material composition, in which a positive active material, a conductive material, a binder, and a solvent are mixed, is prepared. The positive active material composition is directly coated onto a metal current collector and the coated metal current collector is dried, thereby manufacturing a positive electrode plate. In another embodiment, the positive active material composition may be cast on a separate support, and then a film separated from the support may be laminated on a metal current collector, thereby manufacturing a positive electrode plate.

The positive active material may include at least one selected from the group consisting of lithium cobalt oxide, lithium nickel cobalt manganese oxide, lithium nickel cobalt aluminum oxide, lithium iron phosphate, and lithium manganese oxide, but the present disclosure is not limited thereto, and any suitable positive active material that may be used in the art may be used.

For example, the positive active material may be a compound represented by any one of the following formulae: $Li_aA_{1-b}B_bD_2$ where $0.90\leq a\leq1.8$ and $0\leq b\leq0.5$; $Li_aE_{1-b}B_bO_{2-c}D_c$ where $0.90\leq a\leq1.8$, $0\leq b\leq0.5$, and $0\leq c\leq0.05$; $LiE_{2-b}B_bO_{4-c}D_c$ where $0\leq b\leq0.5$ and $0\leq c\leq0.05$; $Li_aNi_{1-b-c}Co_bB_cD_\alpha$ where $0.90\leq a\leq1.8$, $0\leq b\leq0.5$, $0\leq c\leq0.05$, and $0<\alpha\leq2$; $Li_aNi_{1-b-c}Co_bB_cO_{2-\alpha}F_\alpha$ where $0.90\leq a\leq1.8$, $0\leq b\leq0.5$, $0\leq c\leq0.05$, and $0<\alpha<2$; $Li_aNi_{1-b-c}Co_bB_cO_{2-\alpha}F_\alpha$ where $0.90\leq a\leq1.8$, $0 \leq b \leq 0.5$, $0 \leq c \leq 0.05$, and $0 < \alpha < 2$; $Li_aNi_{1-b-c}Mn_bB_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dG_eO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the above formulae, A is nickel (Ni), cobalt (Co), manganese (Mn), or a combination thereof; B is Al, Ni, Co, Mn, Cr, Fe, Mg, Sr, V, a rare earth element, or a combination thereof; D is oxygen (O), fluorine (F), sulfur (S), phosphorus (P), or a combination thereof; E is Co, Mn, or a combination thereof; F is F, S, P, or a combination thereof; G is Al, Cr, Mn, Fe, Mg, lanthanum (La), cerium (Ce), Sr, V, or a combination thereof; Q is Ti, Mo, Mn, or a combination thereof; I is Cr, V, Fe, scandium (Sc), yttrium (Y), or a combination thereof; and J is V, Cr, Mn, Co, Ni, Cu, or a combination thereof.

In addition, the above-described compounds may have a coating layer on their surfaces, and in another embodiment, the compounds may be used in combination with a compound including a coating layer. The coating layer may include a coating element compound such as an oxide of the coating element, a hydroxide of the coating element, an oxyhydroxide of the coating element, an oxycarbonate of the coating element, or a hydroxycarbonate of the coating element. These compounds constituting the coating layer may be amorphous or crystalline. The coating element included in the coating layer may be Mg, Al, Co, K, Na, Ca, Si, Ti, V, Sn, Ge, Ga, B, As, Zr, or a mixture thereof. A coating layer may be formed by using the coating elements in the aforementioned compounds by using any one of various suitable coating methods that do not adversely affect physical properties of the positive active material (e.g., spray coating, immersion, and/or the like). The coating layer formation methods will be readily apparent to those of ordinary skill in the art upon reviewing the present disclosure, and thus, the coating layer formation methods will not be described in more detail here.

Non-limiting examples of the positive active material include $LiNiO_2$, $LiCoO_2$, $LiMn_xO_{2x}$ (where x=1 or 2), $LiNi_{1-x}Mn_xO_2$ where $0<x<1$, $LiNi_{1-x-y}Co_xMn_yO_2$ (where $0 \leq x \leq 0.5$ and $0 \leq y \leq 0.5$), $LiFeO_2$, $V_2O_5$, TiS, and MoS.

The conductive material, the binder, and the solvent included in the positive active material composition may be the same as those of the negative active material composition. Meanwhile, a plasticizer may be further added to the positive active material composition and/or the negative active material composition to form pores in an electrode plate.

The amounts of the positive active material, the conductive material, the binder, and the solvent may be the same amounts as those generally used in the art for a lithium battery. At least one of the conductive material, a general binder, and the solvent may be omitted according to the use and configuration of a lithium battery.

Meanwhile, the binder used in manufacturing the positive electrode may be the same as the binder included in the coating layer of the separator.

Next, the above-described separator is arranged between the positive electrode and the negative electrode.

In an electrode assembly including the positive electrode/separator/negative electrode, as described above, the separator between the positive electrode and the negative electrode is a separator including a substrate and a coating layer on at least a surface of the substrate, wherein the coating layer includes first organic particles, second organic particles, and a first binder, and the first organic particles have a smaller mean particle diameter (D50) than that of the second organic particles, and at least one of the first organic particles and the second organic particles has a core-shell structure.

The separator may be separately prepared and arranged between the positive electrode and the negative electrode. In some embodiments, an electrode assembly including the positive electrode/separator/negative electrode may be wound into a jelly-roll form, the jelly-roll-type assembly may be accommodated in a battery case or a pouch and thermally softened while being pressed in a state in which it is accommodated in the battery case or the pouch and pre-charged, and then may be heat-pressed and cold-pressed, followed by a formation operation in which charging and discharging processes are performed under pressing and heating conditions.

Next, an electrolyte is prepared.

The electrolyte may be in a liquid or gel state.

For example, the electrolyte may be an organic electrolytic solution. In addition, the electrolyte may be in a solid state. For example, the solid electrolyte may include boron oxide, lithiumoxynitride, and/or the like, but the present disclosure is not limited thereto, and any suitable solid electrolyte that may be used in the art may be used. The solid electrolyte may be formed on the negative electrode by a method such as sputtering and/or the like.

For example, the organic electrolytic solution may be prepared by dissolving a lithium salt in an organic solvent.

As the organic solvent, any suitable organic solvent that may be used in the art may be used. For example, the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethylether, a mixture thereof, and/or the like.

As the lithium salt, any suitable lithium salt that may be used in the art may be used. Non-limiting examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, LiI, and a mixture thereof.

As illustrated in FIG. 1, a lithium battery 1 includes a positive electrode 3, a negative electrode 2, and a separator 4. The positive electrode 3, the negative electrode 2, and the separator 4 are wound or folded into a jelly-roll form and accommodated in a battery case 5. Subsequently, an organic electrolytic solution is injected into the battery case 5 and the battery case 5 is sealed with a cap assembly 6, thereby completing the manufacture of the lithium battery 1. The battery case 5 may have a cylindrical shape, a rectangular shape, a thin-film shape, or the like. For example, the lithium battery may be a thin-film-type battery. The lithium battery may be a lithium ion battery. The lithium battery may be a lithium polymer battery.

The separator may be arranged between the positive electrode and the negative electrode to manufacture an electrode assembly. Electrode assemblies are stacked in a bi-cell structure and wound into a jelly-roll form, and then are impregnated with an organic electrolytic solution, and the resulting structure is accommodated in a pouch and hermetically sealed, thereby completing the manufacture of a lithium ion polymer battery.

In addition, a plurality of electrode assemblies may be stacked to form a battery pack, and such a battery pack may be used in all types or kinds of devices that require high capacity and high output. For example, the battery pack may be used in notebook computers, smartphones, electric vehicles, and the like.

In some embodiments, the lithium battery has excellent rate capability and excellent lifespan characteristics, and thus, is suitable for use in electric vehicles (EVs). For example, the lithium battery is suitable for use in hybrid vehicles such as plug-in hybrid electric vehicles, and the like.

Hereinafter, the present disclosure will be described in further detail with reference to the following examples and comparative examples. However, these examples are provided for illustrative purposes only and are not intended to limit the scope of the present disclosure.

Manufacture of Separator

Manufacture Example 1

Cross-linkable polymethylmethacrylate (PMMA) having a mean particle diameter (D50) of 0.2 μm was prepared as first organic particles.

50 parts by weight of the cross-linkable PMMA was mixed with 25 parts by weight of polypropylene (PP), thereby preparing core-shell particles as second organic particles having a mean particle diameter (D50) of 0.6 μm in which cross-linkable PMMA core portions were coated with PP.

The first organic particles, the second organic particles, 21 parts by weight of a first binder (electrode-adhesive binder) having a mean particle diameter (D50) of 0.4 μm, and 4 parts by weight of a second binder (substrate-adhesive binder) having a mean particle diameter (D50) of 0.3 μm were mixed to prepare a slurry for forming a coating layer. The first binder is a PMMA-based acrylate binder, and the second binder is a polystyrene (PS) binder. The degree of swelling of each binder after being maintained in an electrolytic solution at 70° C. for 72 hours was in a range of 500% to 1,500%. When the degree of swelling of each binder in the electrolytic solution is too low, adhesion between the binder and an electrode is reduced, and when the degree of swelling of each binder in the electrolytic solution is too high, internal resistance of the electrode tends to increase.

The slurry for forming a coating layer was subjected to gravure printing on opposite surfaces of a porous polyethylene substrate having a thickness of 8.7 μm to manufacture a separator in which coating layers having a thickness of 1.0 μm and formed of a blend of inorganic particles and a binder were respectively arranged on the opposite surfaces of the porous substrate. The thickness of the coating layer formed on each surface was 1.0 μm. The thickness of the separator was 10.7 μm. In this case, the time taken for 100 cc of air to pass through the porous polyethylene substrate was 151 seconds.

Comparative Manufacture Example 1

A separator was manufactured in substantially the same manner as in Manufacture Example 1, except that 75 parts by weight of boehmite (BG611. Anhui Estone Materials & Technology Co., Ltd.) having a mean particle diameter (D50) of 0.6 pm was used as inorganic particles, instead of the first organic particles and the second organic particles.

Comparative Manufacture Example 2

A separator was manufactured in substantially the same manner as in Manufacture Example 1, except that the second organic particles were not used, and the amount of the first organic particles was changed to 75 parts by weight.

Comparative Manufacture Example 3

A separator was manufactured in substantially the same manner as in Manufacture Example 1, except that the first organic particles were not used, and the second organic particles were used in an amount of 75 parts by weight.

Comparative Manufacture Example 4

A separator was manufactured in substantially the same manner as in Manufacture Example 1, except that the first organic particles had a mean particle diameter (D50) of 0.4 μm.

Comparative Manufacture Example 5

A separator was manufactured in substantially the same manner as in Manufacture Example 1, except that the second organic particles had a mean particle diameter (D50) of 0.2 μm.

Comparative Manufacture Example 6

A separator was manufactured in substantially the same manner as in Manufacture Example 1, except that the second organic particles had a mean particle diameter (D50) of 0.7 μm.

Manufacture of Lithium Battery

EXAMPLE 1

Manufacture of Negative Electrode 97 wt % of graphite particles (C1SR, Japan Carbon) having a mean particle diameter of 25 μm, 1.5 wt % of a styrene-butadiene-rubber (SBR) binder (ZEON), and 1.5 wt % of carboxymethylcellulose (CMC, NIPPON A&L) were mixed, and then the resulting mixture was added to distilled water and stirred using a mechanical stirrer for 60 minutes to prepare a negative active material slurry. The slurry was coated on a copper current collector having a thickness of 10 μm by using a doctor blade, dried in a hot-air dryer at 100° C. for 0.5 hours, and then dried again in a vacuum at 120° C. for 4 hours, and roll-pressed, thereby completing the manufacture of a negative electrode plate.

Manufacture of Positive Electrode 97 wt % of $LiCoO_2$, 1.5 wt % of carbon black powder as a conductive material, and 1.5 wt % of polyvinylidenefluoride (PVdF, SOLVAY) were mixed, and then the resulting mixture was added to N-methyl-2-pyrrolidone as a solvent and stirred using a mechanical stirrer for 30 minutes to prepare a positive active material slurry. The slurry was coated on an aluminum current collector having a thickness of 20 μm by using a doctor blade, dried in a hot-air dryer at 100° C. for 0.5 hours, and then dried again in a vacuum at 120° C. for 4 hours, and roll-pressed, thereby completing the manufacture of a positive electrode plate.

Jelly-Roll-Type Electrode Assembly

The separator manufactured according to Manufacture Example 1 was arranged between the fabricated positive and negative electrode plates, and then the resulting structure was wound to manufacture a jelly-roll-type electrode assembly. The jelly-roll-type electrode assembly was put in a pouch and an electrolytic solution was injected thereinto, and then the pouch was hermetically sealed.

As the electrolytic solution, a solution prepared by dissolving 1.3 M $LiPF_6$ in a mixed solvent of ethylene carbonate (EC)/ethyl methyl carbonate (EMC)/diethyl carbonate (DEC) in a volume ratio of 3:5:2 was used.

The jelly-roll-type electrode assembly accommodated in the pouch was subjected to thermal softening at a temperature of 70° C. for 1 hour while a pressure of 250 kgf/cm² was applied thereto and to pre-charging up to a state of charging (SOC) of 50%.

The jelly-roll-type electrode assembly was heat-pressed at a temperature of 85° C. for 180 seconds while a pressure of 200 kgf/cm² was applied thereto. In the heat-pressing process, while a binder was changed from a gel state to a sol state, adhesion between positive electrode/negative electrode and a separator was generated.

Subsequently, the jelly-roll-type electrode assembly was cold-pressed at a temperature of 22° C. to 23° C. for 90 seconds while a pressure of 200 kgf/cm² was applied thereto. In the cold-pressing process, the binder was changed from a sol state to a gel state.

Subsequently, the pouch was degassed, and the lithium battery was charged at a constant current rate of 0.2 C at 45° C. for 1 hour while a pressure of 200 kgf/cm² was applied to the jelly-roll-type electrode assembly until the voltage reached 4.3 V, and charged at a constant voltage of 4.3 V until the current reached 0.05 C. Thereafter, cycles of discharging at a constant current of 0.2 C until the voltage reached 3.0 V were repeated five times, thereby performing a formation operation.

COMPARATIVE EXAMPLES 1 to 6

Lithium batteries were manufactured in substantially the same manner as in Example 1, except that the separators manufactured according to Comparative Manufacture Examples 1 to 6 were respectively used.

Evaluation Example 1: Air Permeability Test for Separators

The jelly-roll-type electrode assembly was taken out of the pouch of each of the lithium batteries of Example 1 and Comparative Examples 1 to 6 having undergone the formation operation, and a separator was separated from each assembly to evaluate air permeability.

The air permeability was measured by measuring the time (unit: sec) taken for 100 cc of air to pass through each separator by using measurement equipment (EG01-55-1MR, ASAHI SEIKO), and the results thereof are shown in Table 1 below.

Evaluation Example 2: Measurement of Adhesive Strength with Substrate

The jelly-roll-type electrode assembly was taken out of the pouch of each of the lithium batteries of Example 1 and Comparative Examples 1 to 6 having undergone the formation operation, and a separator was separated from each assembly to evaluate adhesive strength between the substrate and the coating layer, and the results thereof are shown in Table 1 below.

Evaluation Example 3: Measurement of Adhesion (Adhesive Strength) between Negative Electrode and Separator Adhesion between an electrode and a separator, which had been taken out of the pouch of each of the lithium batteries of Example 1 and Comparative Examples 1 to 6 having undergone the formation operation, was evaluated.

The adhesion was measured by measuring adhesion between a positive active material layer/negative active material layer and a separator by using a 3-point bending (INSTRON) measurement method. In particular, each pouch cell having undergone the formation operation was pressed at a rate of 5 mm/min to measure a maximum (Max) value (N, MPa) of each cell from a zero-point to 5 mm bending, and the results thereof are shown in Table 1 below.

Evaluation Example 4: Measurement of Withstand Voltage Characteristics

The jelly-roll-type electrode assembly was taken out of the pouch of each of the lithium batteries of Example 1 and Comparative Examples 1 to 6 having undergone the formation operation, a separator was separated from each assembly, and evaluation was performed on each separator using a T0S5301 device available from KIKISUI under conditions of an AC mode, 0.3 mA, and 0.3175 kV/sec. The results thereof are shown in Table 1 below.

TABLE 1

| | Air permeability time (sec) | Adhesive strength with substrate | Bending strength | BDV |
|---|---|---|---|---|
| Example 1 | 189 | 10.4 | 181 | 1.31 |
| Comparative Example 1 | 181 | 8.6 | 80 | 0.981 |
| Comparative Example 2 | 194 | 11.7 | 149 | 1.27 |
| Comparative Example 3 | 175 | 10.3 | 123 | 1.21 |
| Comparative Example 4 | 185 | 10.9 | 151 | 1.16 |
| Comparative Example 5 | 211 | 12.7 | 191 | 1.28 |
| Comparative Example 6 | 171 | 10.1 | 167 | 1.08 |

As shown in Table 1, the separator used in Example 1 exhibited somewhat reduced air permeability as compared to that of the separators used in Comparative Examples 1, 3, 4, and 6, and exhibited enhanced air permeability as compared to that of the separators used in Comparative Examples 2 and 5.

In addition, the separator used in Example 1 exhibited adhesive strength with the substrate that was similar to that of the separators used in Comparative Examples 2 to 6, and exhibited significantly enhanced adhesive strength with the substrate, as compared to that of the separator used in Comparative Example 1.

In addition, the lithium battery of Example 1 exhibited somewhat reduced adhesion, as compared to that of the lithium battery of Comparative Example 5, and exhibited significantly enhanced adhesion, as compared to that of the lithium batteries of Comparative Examples 1 to 4 and 6.

In addition, the lithium battery of Example 1 exhibited a withstand voltage level similar to that of the lithium batteries of Comparative Examples 2 and 5, and exhibited significantly enhanced withstand voltage characteristics, as compared to that of the lithium batteries of Comparative Examples 1, 3, 4, and 6.

In conclusion, a separator according to an embodiment of the present disclosure and a battery including the separator exhibited excellent air permeability, excellent adhesive strength with a substrate, excellent adhesion between an electrode and the separator, and excellent withstand voltage characteristics, without deterioration of any one of the above characteristics, when compared to those of existing separators and batteries including the separators.

As is apparent from the foregoing description, a separator including a coating layer having a novel composition exhibits enhanced thermal stability and enhanced adhesion with an electrode plate, and a lithium battery including the separator may exhibit enhanced lifespan characteristics and enhanced battery stability.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims, and equivalents thereof.

What is claimed is:

1. A separator comprising:
   a substrate; and
   a coating layer on at least a surface of the substrate,
   wherein the coating layer comprises first organic particles, second organic particles, and a first binder,
   wherein the first organic particles have a smaller mean particle diameter (D50) than that of the second organic particles, and
   at least one selected from the first organic particles and the second organic particles has a core-shell structure.

2. The separator of claim 1, wherein the mean particle diameter (D50) of the first organic particles is in a range of about 0.1 μm to about 0.3 μm.

3. The separator of claim 1, wherein the mean particle diameter (D50) of the second organic particles is in a range of about 0.3 μm to about 0.6 μm.

4. The separator of claim 1, wherein the first organic particles are obtained from at least one selected from a styrene-based compound and a derivative thereof, an acrylate-based compound and a derivative thereof, a diallyl phthalate-based compound and a derivative thereof, a polyimide-based compound and a derivative thereof, a copolymer thereof, and a mixture thereof.

5. The separator of claim 1, wherein the second organic particles have a core-shell structure.

6. The separator of claim 1, wherein the core-shell structure comprises a core portion and a shell portion, wherein a weight of the shell portion is 50 wt % or more with respect to a total weight of the core portion.

7. The separator of claim 6, wherein the core portion has a thermal decomposition temperature of 150° C. or more and comprises at least one selected from an acrylate-based compound and a derivative thereof, a diallyl phthalate-based compound and a derivative thereof, a polyimide-based compound and a derivative thereof, a copolymer thereof, and a mixture thereof, and
   the shell portion has a melting point ($T_m$) of 130° C. or less and comprises at least one selected from polypropylene (PP), polyethylene (PE), polystyrene (PS), polyvinylidene fluoride (PVDF), polymethylmethacrylate (PMMA), an acrylate-based compound, polyacrylonitrile (PAN), and an azodicarbonamide-based compound.

8. The separator of claim 1, wherein the first binder comprises an acrylate group.

9. The separator of claim 1, wherein the first binder has a glass transition temperature ($T_g$) of about 50° C. to about 100° C.

10. The separator of claim 1, wherein the coating layer further comprises a second binder, wherein the second binder has a mean particle diameter (D50) smaller than or the same as the mean particle diameter (D50) of the second organic particles.

11. The separator of claim 10, wherein the second binder is located in at least one pore selected from pores between the second organic particles, pores between particles of the first binder, and pores between the second organic particles and the first binder.

12. The separator of claim 10, wherein the mean particle diameter (D50) of the second binder is smaller than or the same as that of the first binder.

13. The separator of claim 10, wherein the second binder includes an acrylate group or a styrene group.

14. The separator of claim 1, wherein the coating layer is arranged on opposite surfaces of the substrate.

15. The separator of claim 1, wherein the coating layer has a thickness of about 0.1 μm to about 3.0 μm.

16. A lithium battery comprising:
    a positive electrode;
    a negative electrode; and
    the separator of claim 1 between the positive electrode and the negative electrode.

* * * * *